United States Patent Office 3,090,804
Patented May 21, 1963

3,090,804
PROCESS FOR PREPARING 1-CYANOBU-
TADIENE-1,3
Kurt Sennewald, Knapsack, near Cologne, Klaus Born, Hermulheim, near Cologne, and Heinrich Rehberg, Efferen, near Cologne, Germany, assignors to Knapsack-Griesheim Aktiengesellschaft, Knapsack, near Cologne, Germany, a corporation of Germany
No Drawing. Filed Apr. 21, 1960, Ser. No. 23,636
3 Claims. (Cl. 260—465.9)

The present invention relates to a process for preparing 1-cyanobutadiene-1,3 by the thermal splitting of 1-acetoxy-1-cyanobutene-2 which leads to the formation of equimolar quantities of 1-cyanobutadiene-1,3 and acetic acid.

It is known to convert 1-acetoxy-1-cyanobutene-2 by thermal splitting into 1-cyanobutadiene-1,3 and acetic acid. That splitting process has hitherto been carried out at temperatures within the range of 300° to 700° C. in an externally heated tube. Since in the aforesaid process the splitting energy is supplied to the 1-acetoxy-1-cyanobutene-2- exclusively through the walls of the tube the diameter of the tube has accordingly to be small. Besides it is of advantage to fill the reaction chamber with fillers such as quartz, clay, graphite and metal rings or with dehydration catalysts such as bauxite, aluminum oxide, thorium oxide and aluminum phosphate.

The splitting product obtained is of black-brown coloration and contains approximately equal portions of acetic acid and cyanobutadiene in addition to starting material that has not undergone conversion and resinification products.

The aforesaid method does not enable an economical preparation of cyanobutadiene, which is substantially due to the following facts:

(1) When operating according to the known methods great difficulties are encountered in the separation of cyanobutadiene and acetic acid which are due to the fact that the cyanobutadiene is very readily susceptible of dimerization or polymerization reactions. Various methods have already been proposed for handling the products. It has, for example, been proposed to separate acetic acid and cyanobutadiene by distillation and with high reflux ratio in a column having a great separating efficiency. Since the acetic acid which has a boiling point of 118° C. under a pressure of 760 mm. of mercury and which is the lower-boiling of the two components is distilled off before the cyanobutadiene which has a boiling point of about 140° C. under a pressure of 760 mm. of mercury, considerable quantities of cyanobutadiene are lost by dimerization or further polymerization. It is also known to separate acetic acid from cyanobutadiene by distillation in the presence of amines, in particular, triethyl amine. In this case a higher boiling azeotropic mixture of acetic acid and triethyl amine is formed, so that the cyanobutadiene which is the component having the lower boiling point can be separated relatively easily by distillation from the splitting products. It has also been proposed to separate the acetic acid from the cyanobutadiene by a washing with a soda solution and water or with water that is saturated with common salt. However, in the last-mentioned method, too, considerable quantities of cyanobutadiene are lost, which is in particular due to the solubility in water of the component. According to the statements made in the literature and as we have ascertained by experiences of our own it has hitherto only been possible to obtain cyanobutadiene in yields of 55 to 70%. In order to avoid the aforesaid difficulties connected with the separation of 1-cyanobutadiene-1,3 and acetic acid it has been proposed to use 1-benzoyl-1-cyanobutene-2 instead of 1-acetoxy-1-cyanobutene-2 as starting material for the preparation of cyanobutadiene.

(2) Not only 1-cyanobutadiene-1,3 but also 1-acetoxy-1-cyanobutene-2 which is used as starting material is a rather sensitive material which has a strong tendency to resinify and to become brittle whereby according to statements made in the literature further losses of yield are caused. During the splitting operation coking products separate in the reaction tube which latter must therefore be cleaned after having been used for several hours. In addition to starting material that has not undergone conversion the condensed splitting products contain other high-boiling constitutents and resinous substances which are disturbing during the handling of the splitting products. It has therefore also been proposed to free the crude splitting products from the above-mentioned impurities by a distillation that is carried out prior to the ulterior treatment.

(3) In order to ensure an economical manufacture of cyanobutadiene it is necessary to recover the acetic acid in a fairly quantitative yield which must not be accompanied with a loss of cyanobutadiene. Of the methods of working up which have been described in the literature, the method in which an azeotrope of acetic acid and triethyle amine is formed is best capable of satisfying the aforesaid requirements. However, that method inevitably necessitates a new and complicated operation, viz. the separation of acetic acid and triethyl amine.

Now we have found a process for splitting 1-acetoxy-1-cyanobutene-2 in the absence of a catalyst, wherein cyanobutadiene that is free from acetic acid is obtained in a yield of 93 to 95% and acetic acid is obtained in a yield of 95 to 96%, the percentages being calculated on the 1-acetoxy-1-cyanobutene-2 used as starting material for the splitting process. This result is surprising since after the study of the pertinent literature it could not at all be expected:

(a) That the rather sensitive 1-acetoxy-1-cyanobutene-2 could be split completely and without a separation of coking products taking place in the reaction furnace;

(b) That under the prevailing reaction conditions no splitting of the cyanobutadiene that has already been formed takes place and (c) That cyanobutadiene and acetic acid can be separated quantitatively.

Since the process according to the invention can be carried out in a simple way and without any difficulty it enables cyanobutadiene to be obtained for the first time in an economical way. Owing to its strong tendency towards polymerization and its great reactivity, 1-cyanobutadiene-1,3 is a valuable material for the preparation of a great variety of intermediate products and in particular, of polymerization products.

The essential features of the process of the present invention are the following: Cold 1-acetoxy-1-cyanobutene-2 is heated to the reaction temperature within a fraction of a second by being mixed with hot gases and subsequently acetic acid and 1-cyanobutadiene-1,3 are quantitatively separated from the reaction gases by washing with water. The separation of acetic acid and cyanobutadiene is brought about in a stripping column. An azeotropic mixture of cyanobutadiene and water which is free from acetic acid and which during the condensation is obtained as a mixture of two phases, is obtained at the head of the column and acetic acid which is free from cyanobutadiene is obtained at the bottom of the column. The cyanobutadiene that is drawn off at the head of the column has a strength of 97 to 98% already and it contains only about 1.5% of water and about 0.2% of free hydrocyanic acid. These portions of water and hydrocyanic acid are subsequently eliminated by distillation in a short column whereupon 1-cyanobutadiene-1,3 is obtained which according to chemical and optical examinations is free from any impurity.

The aqueous acetic acid solutions which are free from cyanobutadiene contain, as was ascertained by analysis, 95 to 96% of the quantity of acetic acid that theoretically forms from the quantity of acetoxy-cyanobutene used as starting material. From the aforesaid solutions pure acetic acid is prepared by known methods of concentration.

The following remarks are made with regard to the execution of the process of this invention:

In a spraying device acetoxy-cyanobutene which is introduced in the liquid state is directly atomized by means of a hot current of gas and thereby heated instantaneously to the temperature that is necessary for the splitting process. Since the gas current serves exclusively as carrier of the temperature and as reaction medium any inert gas, for example $N_2$, CO, $CO_2$ or mixtures thereof, can be used. The most easy way of preparing a hot gaseous mixture that is suitable for use in carrying out the splitting process is to burn CO, methane or illuminating gas. The temperature of these burnt gases depends on the quantity of material to be subjected to the splitting process. In general the combustion gases have a temperature within the range of about 700° to 1000° C. If desired, their temperature may be reduced by the addition of cold waste gas.

The temperature of the combustion gases and the quantity of acetoxy-cyanobutene that is introduced are adjusted in such a manner that the gaseous mixture issuing from the spraying device has a temperature of about 450° to about 650° C. The gaseous mixture is then immediately introduced into an empty tube which is externally protected against a loss of heat by radiation and in which the mixture stays for a certain time. With a gas temperature of, for example, 500° to 580° C. the gases remain in the tube for 1 to 6 seconds. Thus a quantitative splitting of the acetoxy compound is brought about, without a separation of decomposition products of any kind taking place in the tube. It stands to reason that the residence time depends on the temperature of the reaction gas and that the splitting process can also be carried out with a shorter duration of stay if the reaction temperature is increased accordingly. The same applies to the reverse conditions.

When the gaseous mixture has passed through the sojourn tube it is cooled to a temperature within the range of about 20° to about 70° C., preferably 30° to 60° C., by quenching with an aqueous acetic acid spray whereby a part of the acetic acid contained in the gas is washed out, without a condensation of cyanobutadiene taking place. The gases coming from the quenching device are worked up in the manner described in the examples that will be given below.

According to the process of the invention 1-acetoxy-1-cyanobutene-2 is suddenly, that is to say in a fraction of a second, heated to the necessary splitting temperature which is above about +400° C. and preferably within the range of about +450° to about +650° C., by means of a hot current of inert gases having a temperature above about +500° C. and preferably within the range of about +700° to about +1000° C. and then the splitting reaction is allowed to proceed within a residence time of about 0.5 to about 10 seconds while the splitting temperature is maintained, the issuing gaseous mixture is cooled, washed with water and the components, viz. 1-cyanobutadiene-1,3 and acetic acid, which are thereby obtained are separated from one another by distillation.

The liquid acetoxy-cyanobutene can advantageously be directly atomized into the reaction chamber or the splitting tube by means of the hot inert gases. The splitting temperatures are preferably maintained within the range of +500° to +600° C., more especially within the range of about +520° to about +580° C. and the residence time is preferably within the range of 1 to 6 seconds. As inert gases there may be used, for example, argon, nitrogen, carbon monoxide, methane or illuminating gas, the latter gases being, if necessary, previously cooled to the required temperature of +700° to +1000° C. by the addition of a cooler inert gas, for example, waste gas. The gaseous mixture leaving the reaction or splitting chamber is cooled to temperatures within the range of about +20° to +70° C., preferably +30° to +60° C., by quenching with water or aqueous acetic acid sprays.

The reaction products are washed out of the precooled gaseous mixture by a washing with water or with water containing acetic acid or preferably by a washing in two stages, one of which is carried out immediately after the other, the first washing being carried out with water containing acetic acid and the second washing being carried out with fresh water. The 1-cyanobutadiene-1,3 is then separated from the acetic acid by being distilled off azeotropically with water and after the condensation the crude product which is the phase of the lower specific gravity is taken off from the aqueous layer. By a subsequent distillation the crude product, viz. 1-cyanobutadiene-1,3, is freed from the remaining portions of water and traces of hydrocyanic acid. The distillations can be carried out with advantage in vacuo. Besides, during the distillations, stabilizers preventing the polymerization of cyanobutadiene, for example, polyvalent phenols, picric acid or sodium nitrite, are added in a concentration of about 0.1 part per thousand, calculated on the total solution.

The following examples serve to illustrate the invention but they are not intended to limit it thereto.

*Example 1*

In a combustion chamber having a length of 530 mm. and a diameter of 240 mm., 1.8 cubic meters per hour of heating gas were completely burnt with 9.2 cubic meters per hour of air. The burnt gases which had a temperature within the range of +820° to +900° C. and which were free from oxygen were cooled to about +760° C. by the introduction of inert gas and allowed to flow at that temperature through a perforated diaphragm having a diameter of 12 mm. into an empty sojourn tube. Between the combustion chamber and the sojourn tube a pressure difference of 260 mm. of mercury was maintained, the combustion chamber being under normal pressure and the sojourn tube being under a reduced pressure of about 500 mm. of mercury. The sojourn tube was protected from the outside against losses of heat. It had an interior height of 1250 mm. and an interior width of 200 mm.

750 grams (5.4 mols) per hour of 1-acetoxy-1-cyanobutene-2 were introduced by means of a dosing pump into the center of the perforated diaphragm via a nozzle that was cooled with water. The acetoxycyanobutene was finely pulverized and directly evaporated by the gases that passed at a high velocity whereby the temperature of the gas was reduced to +525° to 550° C. After an average residence time of 2.6 seconds the reaction gases left the sojourn tube and were cooled to about +60° C. by spraying in water. During this operation a part of the acetic acid contained in the gas was washed out. Since the quenching water was conducted in a cycle the acetic acid accumulated in it. When the concentration had amounted to about 15 to 20% a part of the current was branched off from the cycle in order to increase the concentration of acetic acid, this part of the current being replaced by fresh water.

The cooled gases which contained the 1-cyanobutadiene-1,3 and the remaining portions of acetic acid were introduced into two washing towers connected in series, through the first of which water containing acetic acid and through the second of which fresh water was trickled. By this operation a quantitative separation of the reaction products from the gas current was ensured. The second washing tower served exclusively for the separation of very small quantities of acetic acid which were entrained by the gases leaving the apparatus according to the partial pressure of the acetic acid.

In the washing solution of the first washing tower which contained acetic acid was dissolved the total quantity of cyanobutadiene that had been formed during the splitting process. This solution entered a stripping column in which acetic acid and cyanobutadiene were separated from each other under a pressure of about 300 mm. of mercury with the formation of an azeotropic mixture of cyanobutadiene and water. Under the prevailing pressure the azeotropic mixture boiled at about +68° C. and contained 59% of 1-cyanobutadiene-1,3. During the condensation that was subsequently carried out the two phases separated and the cyanobutadiene which was the phase having the lower specific gravity could be taken off and the aqueous layer was returned to the stripping column. The cyanobutadiene that formed was free from acetic acid and contained on an average 97 to 98% of cyanobutadiene in addition to 1.4 to 1.6% of water and 0.1 to 0.3% of hydrocyanic acid. This crude product was purified in a subsequent distillation under a pressure of 50 to 60 mm. of mercury, and 1-cyanobutadiene-1,3 which, according to optical and chemical examinations was free from impurities, was obtained without difficulty.

In order to prevent cyanobutadiene polymerizations care had to be taken that in all places in which cyanobutadiene was present in concentrated or diluted form a stabilizer was present, too. For this purpose a known stabilizer, for example, a polyvalent phenol, picric acid or sodium nitrite, was used in a concentration of about 0.1 part per thousand.

The water which contained acetic acid and was free from cyanobutadiene was withdrawn via a condenser from the still of the stripping column and returned to the first washing tower. Owing to this circulation the acetic acid accumulated in the wash water. When the concentration of the acetic acid was about 15 to 20% a part of the current leaving the still of the stripping column was branched off in order to increase the concentration of acetic acid and it was replaced by the corresponding quantity of wash water of the second washing tower.

By this mode of operating 406 grams (5.14 mols) of pure 1-cyanobutadiene-1,3 were obtained per hour and at the same time a total quantity of 311 grams (5.18 mols) of acetic acid was washed out of the reaction gases in the quenching device and the washing towers. This corresponded to a yield of 1-cyanobutadiene-1,3 of 95.2% and a yield of acetic acid of 95.9%, the percentages being calculated on the quantity of 1-acetoxy-1-cyanobutene-2 used.

*Example 2*

By burning 2 cubic meters per hour of heating gas with 11.5 cubic meters per hour of air with the addition of 8.5 cubic meters per hour of waste gas a gas current having a temperature within the range of +790° to +810° C. was produced. By means of this gas current 1.0 kilogram (7.19 mols) of 1-acetoxy-1-cyanobutene-2 was evaporated per hour and heated to the splitting temperature of +550° to +580° C. Between the combustion chamber and the sojourn tube a pressure difference of about 50 mm. of mercury was maintained. After an average residence time of 2.1 seconds the reaction gas was cooled in the quenching device to a temperature within the range of +50° to +60° C. and introduced into the washing towers which were connected in series. The 1-cyanobutadiene-1,3 was separated from the washing solution of the first washing tower by being distilled off azeotropically under a pressure of 260 mm. of mercury, and a crude cyanobutadiene containing 97.5 to 98.2% of cyanobutadiene, 1.0 to 1.5% of water and 0.17 to 0.24% of hydrocyanic acid was obtained. In the other respects the experiment was carried out in the manner described in Example 1. Within a 12 hour period a total quantity of 6380 grams of pure cyanobutadiene (80.8 mols) was obtained. The dilute acetic acid that had accumulated in the quenching device and the washing towers contained altogether 4990 grams (83.2 mols) of acetic acid as was ascertained by analysis. Thus, the yield of 1-cyanobutadiene-1,3 amounted to 93.6% and that of acetic acid to 96.4%, the percentages being calculated on the quantity of 1-acetoxy-1-cyanobutene-2 used.

*Example 3*

11.5 cubic meters of a mixture of gas and air were burnt per hour in a combustion chamber. The resulting current of gas had a temperature of about +840° C. and 10.02 kilograms (72 mols) of 1-acetoxy-1-cyanobutene-2 were evaporated within 10 hours in the manner described in Example 1. In the combustion chamber a pressure of 0.6 to 0.7 atmosphere (gage) and in the sojourn tube a pressure of 0.3 to 0.4 atmosphere (gage) were maintained. After a residence time of 6.6 seconds at 530° to 550° C. the hot reaction gases were cooled to an average temperature of +56° C. by spraying in aqueous acetic acid of 18% strength. The gases were washed in one of the washing towers with acetic acid of about 22% strength until they were free from cyanobutadiene and in the second washing tower they were washed with fresh water until they were free from acetic acid. In order to obtain the cyanobutadiene the washing solution of the first washing tower was then introduced into a distilling column, the cyanobutadiene being distilled off azeotropically under a reduced pressure of 380 mm. of mercury. In the other respects the experiment was carried out in the manner described in Example 1.

In this experiment a total quantity of 5380 grams (68.1 mols) of 1-cyanobutadiene-1,3 was obtained. This corresponded to a yield of 94.5%, calculated on the quantity of 1-acetoxy-1-cyanobutene-2 used. Ninety-five percent of the quantity of acetic acid that had originally been used and could theoretically be recoved was obtained in the quenching and washing solutions as determined from the acetic acid balance.

We claim:
1. A process for preparing 1-cyanobutadiene-1,3 by thermal splitting of 1-acetoxy-1-cyanobutene-2 with the formation of equimolecular quantities of 1-cyanobutadiene-1,3 and acetic acid comprising vaporizing liquid 1-acetoxy-1-cyano-butene-2 by atomizing the same with a current of inert gas having a temperature within the range of about +700° C. to about 1000° C. suddenly within a fraction of a second to the necessary splitting temperature of about +450° C. to about 650° C., allowing the splitting reaction to proceed during a residence time of between 0.5 to 10 seconds while the splitting temperature is maintained, precooling the gaseous product mixture flowing off to a temperature within the range of about +20° to about 70° C. by spray-quenching with at least one substance selected from the group consisting of water and aqueous acetic acid, washing the cooled gas by means of at least one substance selected from the group consisting of water and water containing acetic acid, separating 1-cyano-butadiene-1,3 product from acetic acid by azeotropical distillation with water, con- densing the distillate, and drawing off 1-cyano-butadiene-1,3 product from the aqueous phase.

2. A process as claimed in claim 1 wherein the reaction products are washed out of the precooled gaseous mixture in two washing stages carried out successively, the first washing operation being carried out by means of water containing acetic acid and the second washing operation being carried out with fresh water.

3. A process as claimed in claim 1 wherein at least one substance preventing the polymerization of cyano-butadiene and selected from the group consisting of polyvalent phenols, picric acid and sodium nitrite is added during the distillations in a concentration of about 0.1 part per thousand calculated on the total solution.

References Cited in the file of this patent

UNITED STATES PATENTS

| | | |
|---|---|---|
| 2,452,672 | Miller et al. | Nov. 2, 1948 |
| 2,790,822 | Wolfram et al. | Apr. 30, 1957 |